March 31, 1953  C. MALLOW  2,632,952
MEANS FOR ILLUMINATION PLACEMENT IN PHOTOGRAPHY
Filed Jan. 3, 1949  2 SHEETS—SHEET 1
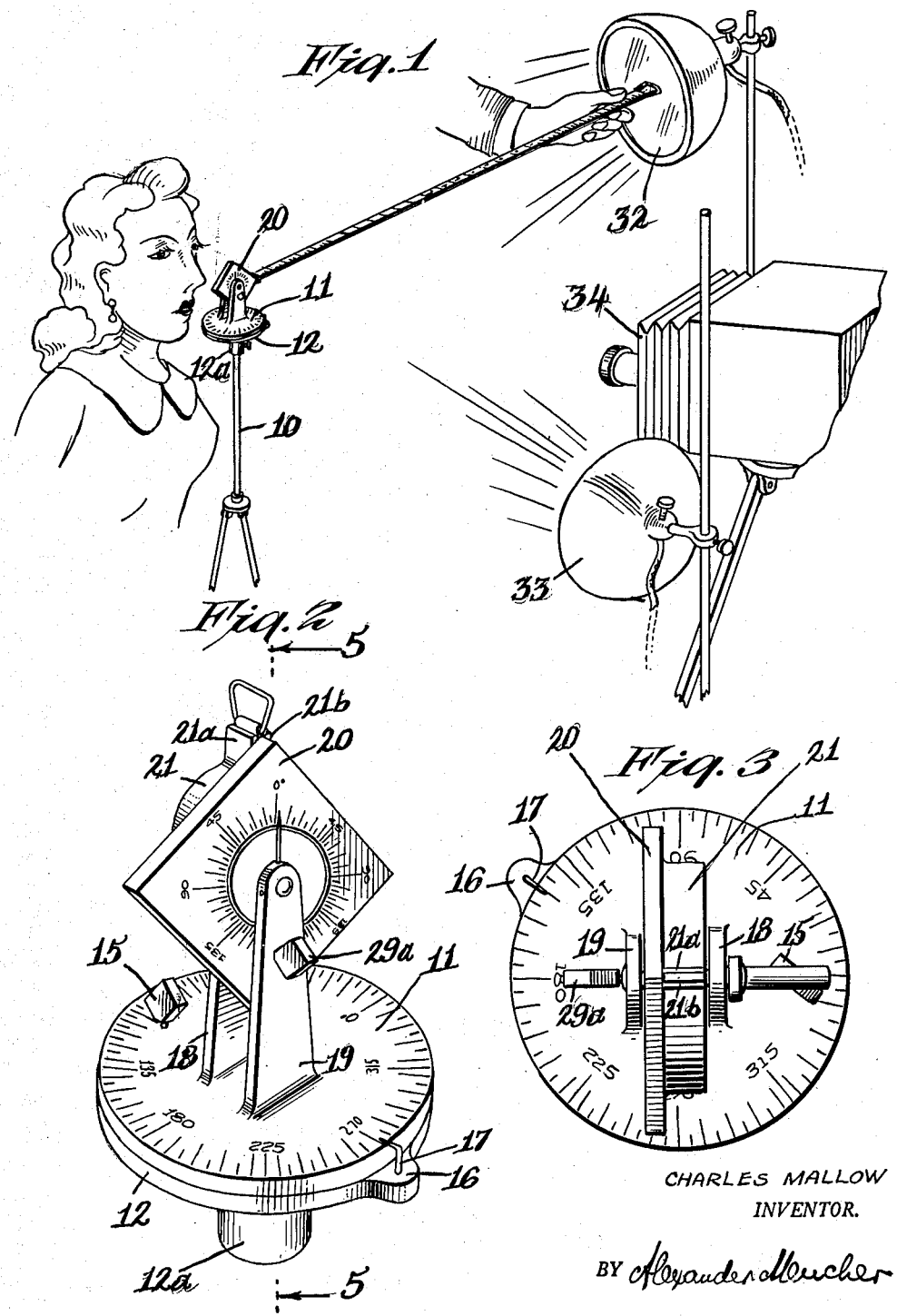
CHARLES MALLOW
INVENTOR.
BY Alexander Bucher
ATTORNEY March 31, 1953 C. MALLOW 2,632,952
MEANS FOR ILLUMINATION PLACEMENT IN PHOTOGRAPHY
Filed Jan. 3, 1949 2 SHEETS—SHEET 2
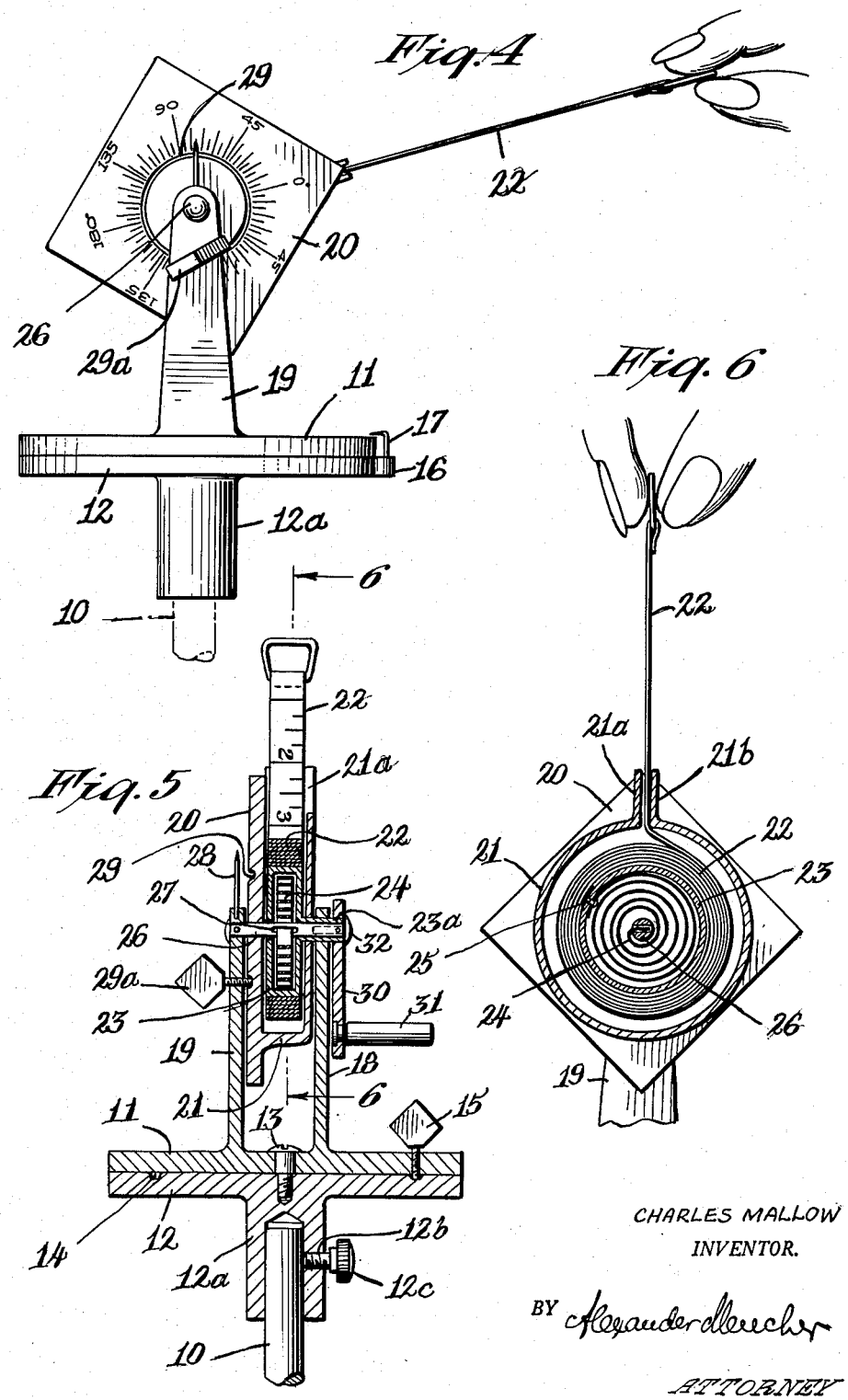
CHARLES MALLOW
INVENTOR.
BY
ATTORNEY Patented Mar. 31, 1953

2,632,952

UNITED STATES PATENT OFFICE 2,632,952

MEANS FOR ILLUMINATION PLACEMENT IN PHOTOGRAPHY

Charles Mallow, New York, N. Y.

Application January 3, 1949, Serial No. 68,839

1 Claim. (Cl. 33—1)

This invention relates to an instrument and a means of orienting a non-professional photographer to proper indoor or artificial illumination for effecting expert photography.

As is well known, placement, nature and power of illumination on the area of a subject for photography are determinative factors of good or bad results in photography, and only after extensive professional or non-professional experience are these factors mastered.

It is an object of the present invention to present both a novel instrument and a means of acquainting an inexperienced photographer with the placement, nature and power of illumination requisite for good results of typical shots so that the tribulations of trial and error are avoided and so that pictures may be even taken by a novice and in many cases by a professional in an expert fashion.

A further object of the invention is to present an instrument for taking pictures which is in the nature of an instruction course until the operator gets the "feel" of proper lighting effects for good and professional photography.

These objects and other incidental ends and advantages of the invention will hereinafter appear in the progress of the disclosure and as set forth in the claim.

Figure 1 is a view in perspective showing the operation of the novel instrument on a subject in relation to a pair of light sources and the camera.

Figure 2 is a view in perspective of the instrument.

Figure 3 is a top plan view of Figure 2.

Figure 4 is a view of the instrument showing operation in connection with an overhead light source.

Figure 5 is a sectional view of Figure 2 across the plane 5—5.

Figure 6 is a sectional view of Figure 5 across the plane 6—6.

In accordance with the invention and the preferred form shown the instrument consists of a pair of dials, one rotatable in the horizontal plane and the other rotatable in the vertical plane.

The vertical dial used to obtain the vertical angle of an illuminating source with respect to the subject carries a tape measure for obtaining the distance of the subject from said illuminating source in accordance with instructions as will hereinafter be set forth. The horizontal dial is used to obtain the relative angular position of the sources of illumination with respect to the subject and the tape measure is used to obtain distances in accordance with instructions as will hereinafter appear.

Thus, the instrument is adapted to be supported on a tripod 10, and consists of a horizontally disposed circular dial 11, the instrument as shown in Figure 1 being placed with respect to the subject so that dial 11 is level with the subject's chin and at about one or two inches distant therefrom.

Dial 11 is rotatable about a circular disc 12 of the same diameter as dial 11, said disc carrying a central and depending tubular section 12a having a threaded orifice 12b for engagement with a thumb-screw 12c for securement of the tripod 10 thereto. A pivot 13 rotatably secures dial 11 to disc 12, which latter is provided with a concentric groove 14 for engagement by a thumb-screw 15 to fix dial 11 in any set position. Disc 12 is provided with a horizontal projection 16 to serve as a mounting for a pointer 17 which extends over the calibrated edge of dial 11 to indicate the angle between two light sources with respect to the sitter as will hereinafter be described.

A vertical dial 20 is mounted between a pair of vertically extending and spaced ears 18 and 19 which are secured adjacent the central portion of horizontal dial 11, said dial having a central chamber 21 on the inner side to carry a measuring tape 22 to measure out distances from the subject to the light source or sources after each of the angles is first obtained. Chamber 21 has an opening at the peripheral side wall defined by a pair of parallel and offset arms 21a and 21b through which tape 22 emerges, the tape 22 being wound on a rotatable core 23 having a central tubular extension 23a. Core 23 has therewithin restraining means for the extension of tape 22 and as shown is in the form of a spring 24 secured thereto at the outer end by a pin or rivet 25 and at the inner end secured to a shaft 26 at opening 27.

Shaft 26 extends from ear 19 and penetrates dial 20 as shown in Figure 5 and emerges through tubular extension 23a while the latter penetrates chamber 21 and ear 18 terminating beyond ear 18 for affixation thereon of a crank 30 having a handle 31. Crank 30 is secured to extension 23a for rotation of spring 24 (in event the spring 24 fails to operate) about shaft 26 by means of a screw 32 which penetrates shaft 26 for purposes of rewinding tape 22 after the tape has been extended by hand for measuring purposes. Dial 20 is rotatable by hand about fixed shaft 26, chamber 21 and tape 22 being rotatable therewith. Dial 20 is provided with calibrations as dial 11 and has associated therewith a pointer 28 fixed to the upper end of the ear 19. Means are also provided to fix the adjusted position of dial 20 such as a thumb-screw 29a in ear 19 engageable with a concentric groove 29 in dial 20.

Cooperating with the instrument above described are one or more illumination sources 32 and 33 and camera 34 which the subject faces.

To take a picture the operator consults typical data furnished with the instrument.

Thus, for an open portrait, the operator has instructions to provide a main spotlight of 250 watts such as light 32 and a secondary diffused light 33 of 500 watts. The placement of these lights with respect to the subject is done through the instrument. The instrument as shown in Figure 1 is placed before the subject so that dial 11 is level with and an inch or two away from the subject's chin with dials 20 and 11 at zero reading. For the positioning of the main light 32, the dial 11 is moved to a four degree angle and the dial 20 to a 27 degree angle and thereafter the tape is extended two feet ten and one-half inches. For the positioning of the secondary light 33, dial 11 is moved to 54 degrees, dial 20 to thirty degrees and the tape extended four feet eight inches.

For a general soft portrait, the operator is instructed to use a diffused main light of 500 watts and a secondary diffused light of 1000 watts. For placement of the main light, dial 11 is moved to 51 degrees, dial 20 to 26 degrees and the tape extended one foot ten and three quarter inches. For placement of the secondary light, dial 11 is set to one degree, dial 20 to thirty one degrees and the tape is extended three feet one and three quarter inches.

For a single source of illumination using a main spotlight of 250 watts, placement is determined by a setting of dial 11 to 61 degrees, dial 20 to twenty four degrees and the tape extended two feet one inch.

For a single source of illumination using a main diffused light of 500 watts placement is determined by setting dial 11 to fifty two degrees, dial 20 to 25 degrees and the tape extended one foot nine and one half inches.

The above four examples showing placement for determination of light sources in conjunction with the instrument are sufficient to give the operator specific instructions for proper illumination to produce a professional picture and at the same time to give him training in illumination so that after the use of the above instrument with the above data for a period of time a "feel" for proper lighting effects will be acquired.

I wish it distinctly understood that minor changes and variations in the material, integration, size and adjustment of parts of the instrument may all be resorted to without departing from the spirit of the invention and the scope of the appended claim.

I claim:

In an instrument for locating illuminating sources used in photography with respect to a subject to be photographed, a support, a horizontally disposed mounting disc on said support, a circular graduated dial of the same diameter as said disc mounted thereon for rotation in a horizontal plane, an indicating means carried by said disc and cooperating with the graduations on said dial, locking means for fixing said dial in a predetermined position relative to said pointer, a pair of spaced ears extending vertically from said dial, a second dial graduated on one side supported between said ears for rotation in a vertical plane, a pointer carried by one of said ears adjacent the last-mentioned graduations, a housing carried by the opposite side of said last-mentioned dial and having a slot therein, a spring-biased measuring tape in said housing centered on the axis of rotation of said second dial and having an end extended outwardly through said slot, and locking means for fixing said vertically disposed dial relative to said pointer on said one of said ears, the horizontal dial being adapted to measure horizontal angular position relative to the subject, the vertical dial being adapted to measure vertical angular position relative to the subject and the tape linear distance relative to the subject.

CHARLES MALLOW.

REFERENCES CITED

The following references are of record in the file of this patent:

UNITED STATES PATENTS

| Number | Name | Date |
|---|---|---|
| 671,690 | Creasey | Apr. 9, 1901 |
| 809,139 | Saxton | Jan. 2, 1906 |
| 1,308,580 | Cram | July 1, 1919 |
| 1,441,153 | Jefferson | Jan. 2, 1923 |
| 1,926,581 | Clarke | Sept. 12, 1933 |
| 2,055,494 | Howard | Sept. 29, 1936 |
| 2,068,822 | Schiesser | Jan. 26, 1937 |
| 2,396,453 | Windle | Mar. 12, 1946 |
| 2,563,599 | Gardner | Aug. 7, 1951 |

FOREIGN PATENTS

| Number | Country | Date |
|---|---|---|
| 16,316 | Great Britain | 1915 |
| 634,592 | France | Nov. 28, 1927 |

OTHER REFERENCES

Pp. 63 to 65 of "How To Make Good Pictures," a book published by Eastman Kodak Co., Rochester, N. Y., received September 28, 1938.